UNITED STATES PATENT OFFICE.

VERNER FREDERIK LASSÒE SMIDTH, OF COPENHAGEN, DENMARK.

CEMENT.

SPECIFICATION forming part of Letters Patent No. 494,763, dated April 4, 1893.

Application filed July 19, 1892. Serial No. 440,554. (No specimens.)

*To all whom it may concern:*

Be it known that I, VERNER FREDERIK LASSÒE SMIDTH, engineer, a subject of the King of Denmark, residing in Copenhagen, in the Kingdom of Denmark, have invented certain new and useful Improvements in Cement, called "Sand-Cement," of which the following is a specification.

The object of this invention is to convert the different kinds of cement in the market, mainly however, Portland cement, into a new kind of cement by which a mortar is obtained that has all the good properties of cement-mortar but is just as cheap if not cheaper than the ordinary lime-mortar. The ordinary cement-mortar is obtained by mixing one part of cement with from one to four parts of sand: sometimes even a still greater quantity of sand is used. When the quantity of sand in proportion to the quantity of cement is increased too much, it is impossible to obtain the required intimate mixture of the substances. At the same time the resistance of the mortar is diminished, and the cement prevented from acting as a sufficient acting medicine for all the grains of sand, which is absolutely necessary when the mortar is to harden into a solid mass.

The object of this invention is therefore to grind the ordinary cement of commerce, such as Portland-cement, Roman-cement, &c., with a certain quantity of the same filling material which is employed for making mortar, namely, sand or gravel, and produce thereby a mixture called sand-cement: and the invention consists of a cement, composed of a ground mixture of Portland or Roman cement, and sand or gravel, as will be fully described hereinafter and finally pointed out in the claim.

In preparing the "sand-cement," a dry mixture of one part of cement is ground with say three parts of sand, so that four parts of sand-cement is obtained. This sand-cement is then used in the same manner as ordinary cement by mixing one part of the same with one or more parts of the filling material (sand, gravel, &c.), so that from one part of cement, say four parts of sand cement and from the latter sixteen parts by weight of mortar are obtained. The said cement-mortar thus obtained has the following advantages:—

First. For filling up the interstices between the grains of sand there is used not only the more expensive cement, but also the cheaper finely ground sand-filler.

Second. In grinding the cement with the filling material, the substances are mixed very intimately together. In making mortar, the cement is everywhere present in finely comminuted state, provided that not more sand is used in the mixture with the sand-cement, that the interstices between the grains of sand are fully and completely filled thereby.

Third. In grinding the cement together with the filling material the cement is obtained as in a finer condition than before so that it can cover a larger surface than before, and consequently bind together a greater number of grains of sand.

It may be added that a series of practical tests made with sand-cement, demonstrated clearly that by the same a mortar of comparatively high binding capacity is obtained.

Having thus described my invention, I claim as new and desire to secure by Letters Patent—

The improved cement herein described, consisting of a dry ground mixture of ordinary cement and sand, gravel or other filling material, substantially as set forth.

In testimony that I claim the foregoing as my invention I have signed my name in presence of two subscribing witnesses.

VERNER FREDERIK LASSÒE SMIDTH.

Witnesses:
HARALD LARSEN,
HANS FR. BOJE.